United States Patent [19]

Rayburn et al.

[11] Patent Number: 4,533,813
[45] Date of Patent: Aug. 6, 1985

[54] OPTICAL SELECTIVE DEMETALLIZATION APPARATUS

[75] Inventors: Charles C. Rayburn, Lynchburg, Va.; Howard R. Padgitt, Park Ridge; Henry J. Flair, Franklin Park, both of Ill.

[73] Assignee: Illinois Tool Works Inc., Chicago, Ill.

[21] Appl. No.: 529,304

[22] Filed: Sep. 6, 1983

[51] Int. Cl.³ .............................................. B23K 26/00
[52] U.S. Cl. ...................... 219/121 LH; 219/121 LT; 350/403
[58] Field of Search .................. 219/121 LH, 121 LJ, 219/121 LN, 121 L, 121 LM, 121 LA, 121 LB, 121 LP, 121 LQ, 121 LR, 121 LS, 121 LG, 121 LT; 350/401, 403

[56] References Cited

U.S. PATENT DOCUMENTS

| | | | |
|---|---|---|---|
| 2,976,764 | 3/1961 | Hyde et al. | 350/403 X |
| 3,626,141 | 12/1971 | Daly | 219/121 LH |
| 3,704,997 | 12/1972 | Smith | 350/401 |
| 3,778,585 | 12/1973 | Mallozzi et al. | 219/121 LT |
| 3,941,973 | 3/1976 | Luck, Jr. et al. | 219/121 LH |
| 4,015,221 | 3/1977 | Dalton | 219/121 LA X |
| 4,081,654 | 3/1978 | Mracek | 219/121 LH |
| 4,307,282 | 12/1981 | Gappa | 219/121 LH X |
| 4,322,600 | 3/1982 | Crahay | 219/121 LT X |

OTHER PUBLICATIONS

A. W. Mueller, *IBM Technical Disclosure Bulletin*, "Laser Formation of Disks Using a Beamsplitter", vol. 22, No. 10, pp. 4723; 4724, Mar. 1980.

*Primary Examiner*—C. L. Albritton
*Attorney, Agent, or Firm*—Donald D. Mondul; Thomas W. Buckman

[57] ABSTRACT

An apparatus for applying optical energy to selectively remove material carried upon a substrate, preferably in substantially parallel lanes of material-free areas, which apparatus comprises an optical generator for generating optical energy in a primary beam, partitioning devices for dividing the primary beam into a plurality of derivative beams, reflective devices for reflecting each of the derivative beams to form a plurality of working beams which impact the substrate, focusing lenses for focusing each of the plurality of working beams upon the substrate, and transport means for transporting the substrate in a direction transverse of the plurality of working beams to effect continuous removal of material in substantially parallel lanes from the substrate by the working beams. In the preferred embodiment of the apparatus, phase retarders are utilized to shift the vector orientation of selected of the derivative beams in a manner whereby each of the working beams is of substantially equal intensity, a beam expander is used for diffusing the primary beam to reduce energy concentration upon optical elements of the apparatus. The lens assemblies are configured to focus the working beams upon the substrate in a substantially elliptical pattern, the major axis of which pattern is substantially aligned with the direction of transport of the substrate, and evacuating assemblies are associated with each working beam to evacuate removed material to preclude deposition of removed material upon the lens assemblies as well as to preclude impairment of focusing of the working beams upon the substrate.

8 Claims, 2 Drawing Figures

OPTICAL SELECTIVE DEMETALLIZATION APPARATUS

BACKGROUND OF THE INVENTION

The present invention is directed to a device for applying optical energy to selectively remove metallized material carried upon a dielectric substrate. Generally a device such as is disclosed herein would be utilized to remove parallel lanes of metallized film from a dielectric material carrying that film such as "Mylar" for the purpose of further processing that film according to the method of U.S. patent application, Ser. No. 475,569, filed Mar. 15, 1983, to produce capacitive devices of the type disclosed in U.S. patent application Ser. No. 475,570 filed Mar. 15, 1983, both of which applications are assigned to the assignee of the present application. "Mylar" is a registered trademark of E. I. DuPont De Nemours & Company. Use of an apparatus such as the invention herein disclosed provides extremely significant savings in cost of manufacture of capacitive devices, which devices have evolved to be a virtual commodity item in the marketplace so that sales of those devices are heavily price-dependent. Thus, savings in cost of manufacture can provide flexibility to a capacitive device manufacturer to adjust prices to meet or beat competition in the marketplace without drastically affecting profit margins on those devices.

SUMMARY OF THE INVENTION

The invention is an apparatus for removal of material, particularly metallized film, from a substrate such as Mylar to produce a plurality of material-free lanes upon the substrate in a pattern particularly suited for further processing of the multi-laned substrate to produce capacitive devices. Laser-type optical devices have long been utilized to burn material from substrates in industry. However, removal of multiple lanes of material, which lanes are substantially uniform in width and substantially parallel in orientation, using a single laser-type source of optical energy is not known by the applicant to have been accomplished as straightforwardly and simply as with the apparatus disclosed herein.

The present invention is an apparatus comprising an optical energy source, such as a laser, which produces an unpolarized primary optical beam, a first polarizing partitioning means which splits the optical beam into a first partitioned beam polarized in the P-vector direction and a second partitioned beam polarized in the S-vector direction. Each of those beams then is passed through a 45° phase retarding device and a subsequent polarizing partitioning device. The 45° phase retarding devices shift the P-vector of the first partitioned beam and the S-vector of the second partitioned beam by 45° to produce light oriented at 45° to the axis of the subsequent beam partitioning means associated with each partitioned beam. Thus, each subsequent beam partitioning means sees, effectively, in each partitioned beam a P-vector and S-vector substantially equal to (discounting optical losses) $1\sqrt{2}$ times the magnitude of the P-vector or S-vector of the partitioned beam prior to passage through its respective phase retarding device. The subsequent polarizing partitioning means encountered by each respective partitioned beam is oriented so that each partitioned beam is subsequently partitioned into a P-vector oriented subsequently partitioned beam and an S-vector oriented subsequently partitioned beam where the magnitude of these subsqunt P-vectors and S-vectors is substantially equal to (again, discounting optical losses) $1\sqrt{2}$ of the magnitude of the P-vector or S-vector prior to its passage through the 45° phase retarding means. Reflective means are interposed in selected of the subsequently partitioned beams to orient those selected beams in a direction allowing further reflection of all subsequently partitioned beams to form working beams which impact a target substrate which is transported transversely of those working beams to provide for removal of lanes of material from the substrate as the substrate passes the working beams. A particularly configured lens is associated with each working beam in order than each working beam can be focused upon the substrate in a substantially elliptical pattern with the major axis of the ellipse substantially aligned with the direction of movement of the substrate as it is transported past the working beams. This elliptical pattern and its major axis orientation allows for a higher speed of transport of the substrate past the beams, greater pattern overlap for a given pulse rate of the laser-type optical energy source, and, thus, an effective lane of removed material removed from the substrate as the substrate passes transverse of the working beams.

It is therefore an object of this invention to provide an optical selective demetallization apparatus which can employ a single source of optical energy to removal multiple lanes of material from a substrate.

It is a further object of the present invention to provide an optical selective demetallization apparatus with a single source of optical energy which will apply multiple beams of optical energy of substantially equal energy intensity to a substrate moving transverse of those beams of optical energy.

It is a still further object of this invention to provide an optical selective demetallization apparatus which will accommodate a high rate of transfer of a substrate past an array of optical beams for a given pulse rate of an optical source while providing a continuous material-free lane associated with each optical beam impacting the transversely-moving substrate.

Further objects and features of the present invention will be apparent from the following specification and claims when considered in connection with the accompanying drawings illustrating the preferred embodiment of the invention.

DETAILED DESCRIPTION OF THE DRAWINGS

DETAILED DESCRIPTION OF THE INVENTION

Figure 1:
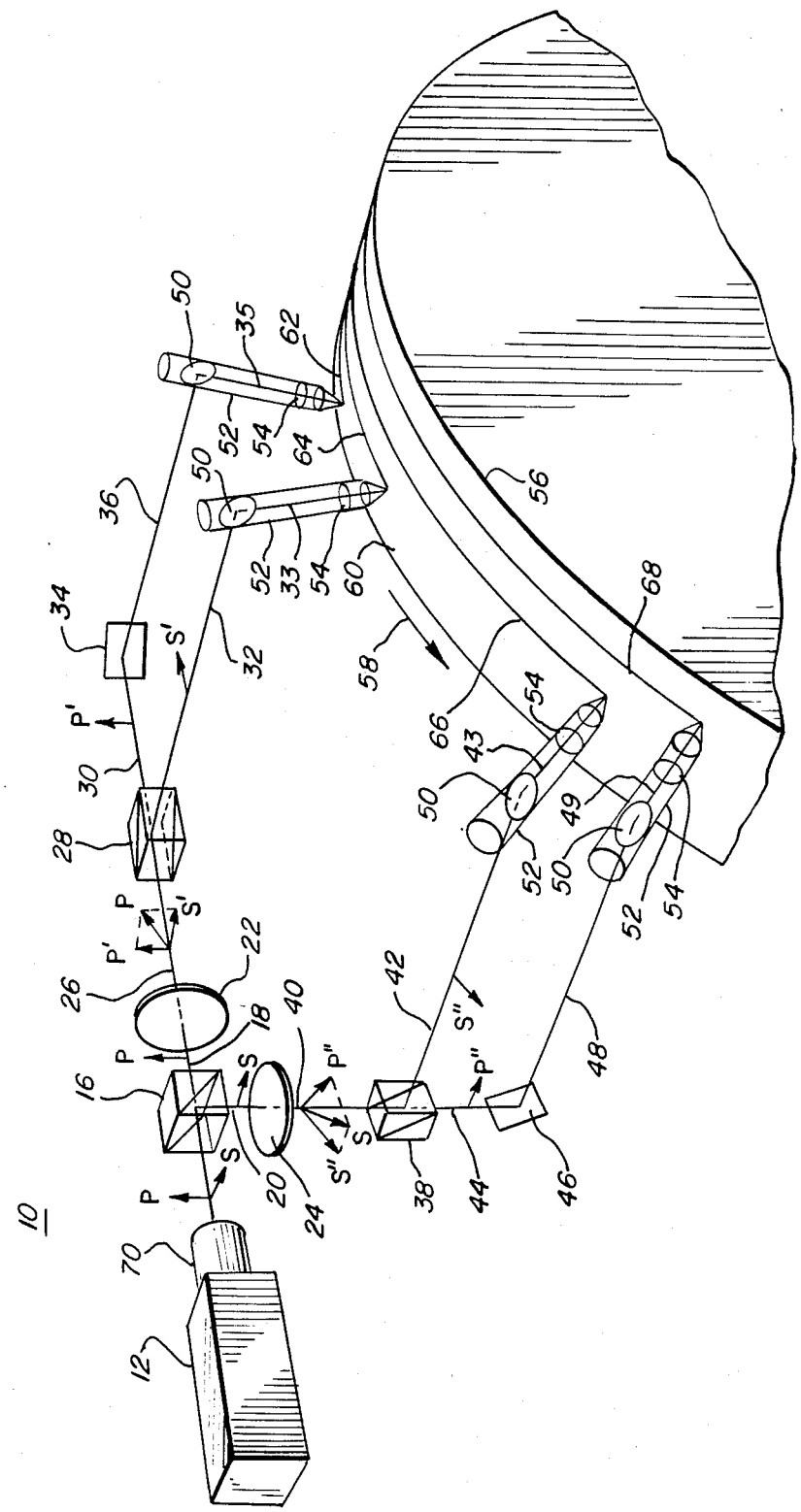
FIG. 1 is an isometric view of a schematic drawing of the preferred embodiment of the present invention.

The preferred embodiment of an optical selective demetallization apparatus 10 is shown schematically in isometric view at FIG. 1. The portion shown in FIG. 1 comprises an optical energy source 12 which emits a primary optical beam 14 of unpolarized light. A first partitioning means 16 polarizes the primary optical beam 14 and splits the primary optical beam 14 into a first derivative beam 18 and a second derivative beam 20. Derivative beams 18 and 20 are polarized, for instance the first derivative beam 18 may be polarized in the P-vector direction and the second derivative beam 20 may be polarized in the S-vector direction, as illustrated in FIG. 1. Situated in derivative beam paths 18 and 20 are phase retarding means 22 and 24. Phase retarding means 22 retards the P-vector orientation of the derivative beam 18 by 45° so that the derivative beam 18 after it passes through the phase retarding means 22, as at retarded beam 26, is seen by a subsequent partitioning means 28 as having a P'-vector and S'-vector orientation where (discounting losses from inefficiencies of optical elements) the magnitude of P'-vector and S'-vector are equal to $1\sqrt{2}^1$P-vector. The subsequent beam partitioning means 28 partitions the phase retarded optical beam 26 into subsequent derivative polarized beams 30 and 32. Subsequent derivative beam 30 is polarized in the P'-vector direction and subsequent beam 32 is polarized in the S'-vector orientation. The magnitude of the P'-vector equals the magnitude of the S'-vector; the P'-vector beam 30 is reflected from reflector 34 to an orientation, as at 36 parallel to subsequent derivative beam 32. The S-vector derivative beam 20 passes through the phase retarding means 24 and is retarded 45° as at 40. Thus the second subsequent partitioning means 38 effectively sees the retarded beam 40 as having a P''-vector and an S''-vector, the magnitude of the P''-vector and the S''-vector being substantially equal to $1\sqrt{2}$ times the magnitude of the S-vector (discounting losses due to optical elements). The second subsequent partitioning means 38 thus partitions the retarded beam 40 into subsequent derivative polarized beams 42 and 44. Subsequent derivative beam 42 would be polarized in the S''-vector orientation and subsequent derivative beam 44 would be polarized in the P''-vector orientation. Subsequent derivative beam 44 is reflected by reflector 46 to orient the subsequent beam 44 in a direction parallel to subsequent derivative beam 42 as at 48. Since the S-vector equals the P-vector in magnitude, the magnitude of energy intensity of beams 36, 32, 42 and 48 are all equal ($1\sqrt{2}^1$ P-vector; $1\sqrt{2}^1$ S-vector). Thus, the intensity of energy present in beams 36, 32, 42 and 48 is equal.

Beams 36, 32, 42 and 48 are reflected by reflectors 50 contained within beam focusing assemblies 52 and focused by lens assemblies 54 to form working beams 35, 33, 43 and 49 which impact upon the substrate 56. Substrate 56 travels in a direction transverse of the working beams 35, 33, 43 and 49 in a direction indicated by arrow 58. The substrate 56 has deposited upon its top side 60 a material, such as metallized film, the substrate itself being made of dielectric material, such as Mylar. Each of the working beams 35, 33, 43 and 49 is offset laterally across the substrate 56 so that as the substrate 56 travels in the direction indicated by arrow 58 transverse of the working beams 35, 33, 43 and 49 a plurality of substantially parallel lanes of metal-free areas is created on the top 60 of the substrate 56. In FIG. 1, working beam 35 creates a metal-free lane 62, working beam 33 creates a metal-free lane 64, working beam 43 creates a metal-free lane 66, and working beam 49 creates a metal-free lane 68. The apparatus of FIG. 1 also includes a beam expander 70 which expands the primary optical beam 14 as it exits the optical energy source 12 in order that the intensity of energy impacting the various optical elements of the apparatus will be diffused, thus generating less heat or other deterioration-inducing phenomenon as the various optical elements are impacted by their respective light beams. The working beams 35, 33, 43 and 49 are focused upon the top surface 60 of the substrate 56 by the lens assemblies 54 of the focusing assemblies 52. The lens assemblies 54 are compound lenses, being comprised of a compound cylindrical and spherical lens configured to focus each of the working beams 35, 33, 43 and 49 upon the top surface 60 of the substrate 56 in a substantially elliptical pattern, the major axis of which elliptical pattern is substantially alinged with the direction of transport of the substrate 56 as indicated by arrow 58 in FIG. 1. The purpose of the elongation of the working beam focused pattern is to spread the optical energy over a greater pattern length along the axis of movement of the substrate 56. This spreading of pattern length increases the possible speed of advance of the substrate 56 past the working beams 35, 33, 43 and 49 for a given pulse rate of the optical energy source 12, when the optical energy source 12 is a pulsing optical energy source such as a laser. Thus, for a given pulse rate of the optical energy source 12, increasing the pattern length in the direction of the movement of the substrate 56 past the working beams 35, 33, 43 and 49 allows a greater speed of advance of the substrate 56 past the working beams and a greater percent overlap of metal-free ellipses for each pulse at that speed. A higher pulse rate would seem to be an alternative manner by which to further increase the speed of advance of the substrate; however, higher pulse rates have been found to result in actual burning of the substrate 56 rather than a mere demetallization of the top surface 60 of the substrate 56, so that increasing pulse rate is not an acceptable alternative.

Figure 2:
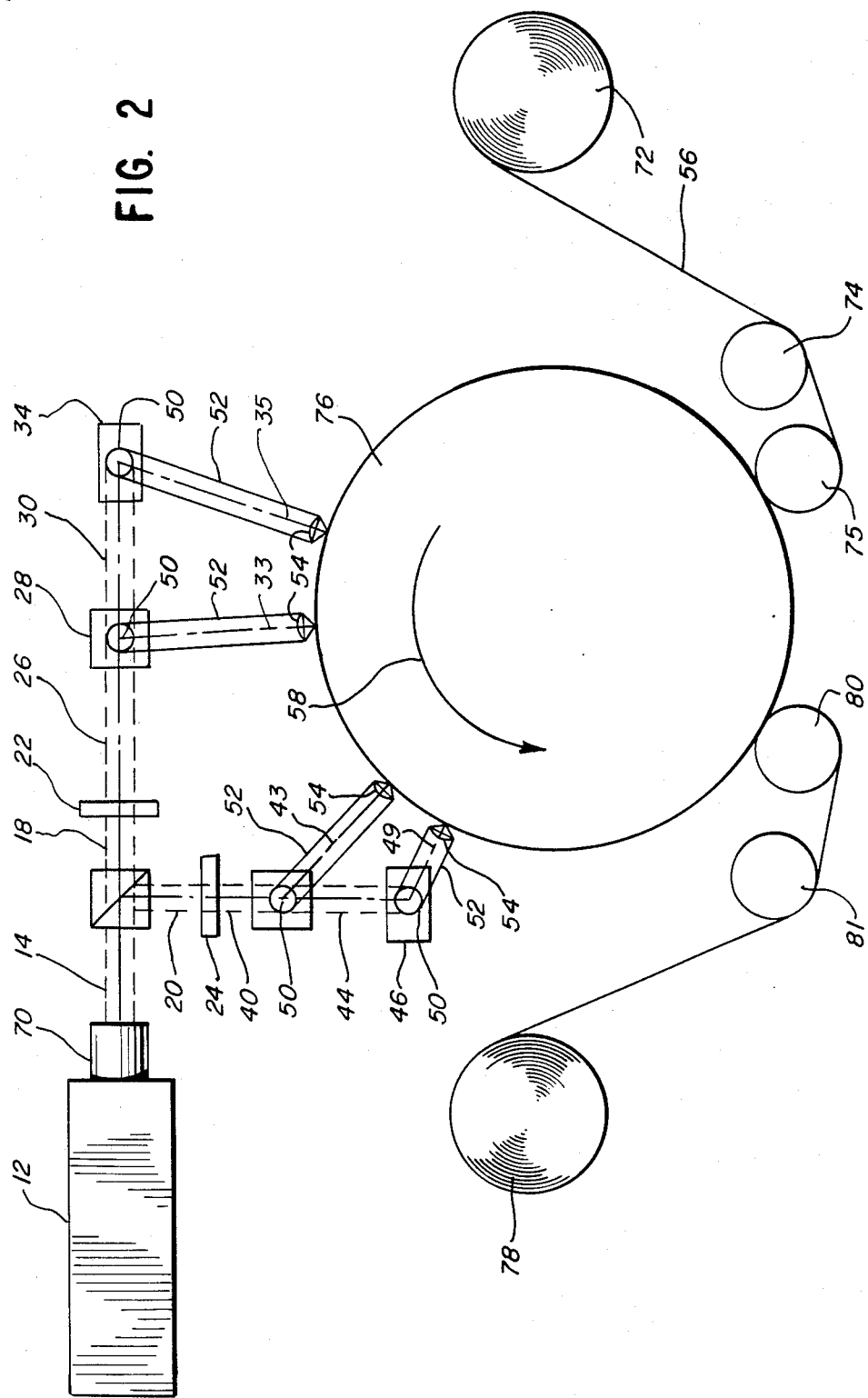
FIG. 2 is a side plan view of a schematic drawing of the preferred embodiment of the present invention.

FIG. 2 shows the apparatus of the present invention in a side plan schematic view. For purposes of ease of understanding of the invention disclosure, like elements shall be given the same reference numerals as they appear in the various views presented in the drawings. In FIG. 2, the optical energy source 12 generates a primary optical beam 14 through a beam expander 70. The primary optical beam 14 is split by the first partitioning means 16 into a first derivative beam 18 and a second derivative beam 20. The first derivative beam 18 passes through a first phase retarding means 22 and is phase-retarded by 45° to form a retarded beam 26. The retarded beam 26 is split and polarized by the first subsequent partitioning means 28 into a subsequent derivative beam with P'-vector orientation 30 and an S'-vector oriented subsequent derivative beam 32, which is not apparent in FIG. 2 since S'-vector oriented subsequent derivative beam 32 in FIG. 2 is a beam traveling perpendicularly out of the plane of FIG. 2. The P'-vector oriented subsequent derivative beam 30 is reflected by reflector 34 in a direction perpendicularly out of the plane of FIG. 2 in the form of beam 36, as seen more clearly in FIG. 1. Beams 32 and 36 encounter reflectors 50 of beam focusing assemblies 52 and are reflected downward toward the substrate 56 in the form of working beams 35 and 33. S-vector oriented second derivative beam 20 passes through the second phase retarding means 24 to form a retarded beam 40. Retarded beam 40 is split by the second subsequent partitioning means 38 into S''-vector oriented subsequent derivative beam 42 (traveling in a direction perpendicularly out of the plane of FIG. 2) and P''-vector oriented subsequent derivative beam 44. P''-vector oriented subsequent derivative beam 44 is reflected by reflector 46 to create subsequent derivative beam 48 in a direction perpendicularly out of the plane of FIG. 2, as seen more clearly in FIG. 1. S''-vector oriented subsequent derivative beam 42 and P''-vector oriented subsequent derivative beam 48 encounter reflectors 50 of beam focusing assemblies 52 and are reflected toward the substrate 56 in the form of working beams 43 and 49. Working beams 35, 33, 43 and 49 are focused by lens assemblies 54 upon substrate 56. Substrate 56 is supplied from a supply roll 72, passed over supply idlers 74 and 75 and onto drum 76, which drum 76 rotates in a direction indicated by arrow 58 in FIG. 2. As drum 76 rotates, the substrate 56 is removed to take-up roller 78 via take up idlers 80 and 81. Thus, the substrate 56 is moved transversely of working beams 35, 33, 43 and 49 so that substantially parallel metal-free zones are created in the top surface 60 of the substrate 56 as was discussed in relation to FIG. 1.

In the preferred embodiment of the present invention, the beam focusing assemblies 52 are each a unitary assembly including reflectors 50 and lens assemblies 54. Each beam focusing assembly 52 is individually axially adjustable with respect to the drum 76 in order that spacing of the lanes of metal-free zones may be adjusted across the top 60 of the substrate 56. Further, in the preferred embodiment of the present invention, associated with each beam focusing assembly 52 is an individual evacuation device (not shown) situated adjacent the point at which the respective working beam for a given beam focusing assembly 52 impacts the top surface 60 of the substrate 56. Each of said evacuation assemblies serves to remove any debris resulting from the interaction of the respective working beam with the metallized film on the top surface 60 of the substrate 56; thus, such debris is precluded from collecting on a respective lens assembly 54 as well as precluded from forming a cloud of debris and thereby hindering the focusing of a respective working beam upon the top surface 60 of the substrate 56. Each of said respective evacuation assemblies is individually axially adjustable with its respective beam focusing assembly 52 with respect to the drum 76.

While the preferred embodiment of the invention, which results in four working beams of equal intensity, has been described herein in detail, it should be readily obvious to one skilled in the art that successive generations of subsequent derivative beams may be developed in a similar apparatus employing the same optical arrangement of elements in successive generations of phase retarding means, partitioning means, and reflecting means as appropriate to develop greater numbers of working beams of equal intensity.

It is to be understood that, while the detailed drawings and specific examples describe preferred embodiments of the invention, they are for the purpose of illustration only, that the apparatus of the invention is not limited to the precise details and conditions disclosed and that various changes may be made therein without departing from the spirit of the invention which is defined by the folowing claims.

We claim:

1. An apparatus for applying optical energy to selectively remove a plurality of lanes of metal film carried upon a substrate; said apparatus comprising optical generation means for generating a primary beam in a primary beam path; beam expander means in said beam path for diffusing said primary beam to produce an expanded beam in an expanded beam path substantially coaxial with said primary beam path; partitioning means for dividing said expanded beam into a plurality of derivative beams; reflective means for redirecting each of said plurality of derivative beams to form a plurality of working beams which impact the substrate; transport means for transporting the substrate in a direction transverse of said plurality of working beams; and focusing means for focusing each of said plurality of working beams upon the substrate, said focusing means comprising a plurality of lens means configured to focus each of said plurality of working beams upon the substrate in a substantially elliptical pattern, the major axis of said substantially elliptical pattern being substantially aligned with said direction of transport of the substrate.

2. An apparatus for applying optical energy to selectively remove a plurality of lanes of material carried upon a substrate comprising optical generation means for generating a primary beam in a primary beam path; beam expander means in said primary beam path for expanding said primary beam to produce an expanded beam in an expanded beam path substantially coaxial with said primary beam path; first partitioning means for dividing said expanded beam into a first derivative beam and a second derivative beam; a plurality of subsequent partitioning means, at least one of said plurality of subsequent partitioning means being associated with said first derivative beam and at least one of said plurality of subsequent partitioning means being associated with said second derivative beam for dividing said first and second derivative beams into a plurality of subsequent derivative beams; a plurality of phase retarder means for shifting the vector orientation of said first and second derivative beams and selected ones of said plurality of subsequent derivative beams, a first of said plurality of phase retarder means being located in said first derivative beam, a second of said plurality of phase retarder means being located in said second derivative beam, and others of said plurality of phase retarder means being located in those of said plurality of subsequent derivative beams which are intermediate successive ones of said plurality of subsequent partitioning means; reflective means for redirecting selected of said plurality of subsequent derivative beams to form a plurality of working beams which impact the substrate; transport means for transporting the substrate in a direction transverse of said plurality of working beams; and focusing means for focusing each of said plurality of working beams upon the substrate; each of said plurality of phase retarder means being respectively oriented in a manner whereby each of said plurality of working beams is of substantially equal intensity.

3. An apparatus for applying optical energy to selectively remove a plurality of lanes of material carried upon a substrate as recited in claim 2 wherein said focusing means comprises lens means configured to focus each of said plurality of working beams upon the substrate in a substantially elliptical pattern, the major axis of said substantially elliptical pattern being substantially aligned with said direction of transport of the substrate.

4. An apparatus for applying optical energy to selectively remove a plurality of lanes of material carried upon a substrate comprising optical generation means for generating a primary beam in a primary beam path; beam expander means in said primary beam path for expanding said primary beam to produce an expanded beam in an expanded beam path substantially coaxial with said primary beam path; first partitioning means for dividing said expanded beam into a first derivative beam and a second derivative beam; a plurality of subsequent partitioning means, as least one of said plurality of subsequent partitioning means being associated with said first derivative beam and at least one of said plurality of subsequent partitioning means being associated with said second derivative beam for dividing said first and second derivative beams into a plurality of subsequent derivative beams; a plurality of phase retarder means for shifting the vector orientation of said first and second derivative beams and selected ones of said plurality of subsequent derivative beams, a first of said plurality of phase retarder means being located in said first derivative beam, a second of said plurality of phase retarder means being located in said second derivative beam, and others of said plurality of phase retarder means being located in those of said plurality of subsequent derivative beams which are intermediate successive ones of said pluarlity of subsequent partitioning means; reflective means for redirecting selected of said plurality of subsequent derivative beams to form a plurality of working beams which impact the substrate; transport means for transporting the substrate in a direction transverse of said plurality of working beams.

5. An apparatus for applying optical energy to selectively remove a plurality of lanes of material carried upon a substrate as recited in claim 4, wherein said apparatus further comprises focusing means for focusing each of said plurality of working beams upon the substrate, and each of said plurality of phase retarder means is respectively oriented in a manner whereby each of said plurality of working beams is of substantially equal intensity.

6. An apparatus for applying optical energy to selectively remove a plurality of lanes of material carried upon a substrate as recited in claim 5, wherein said focusing means comprises lens means configured to focus each of said plurality of working beams upon the substrate in a substantially elliptical pattern, the major axis of said substantially elliptical pattern being substantially aligned with said direction of transport of the substrate.

7. An apparatus for applying optical energy to selectively remove material carried upon a substrate; said apparatus comprising optical generation means for generating optical energy in a primary beam; partitioning means for dividing said primary beam into a plurality of derivative beams; redirective means for redirecting each of said plurality of derivative beams to form a plurality of working beams which impact the substrate; focusing means for focusing each of said plurality of working beams upon the substrate; transport means for transporting the substrate in a direction transverse of said plurality of working beams to effect continuous removal of material from the substrate by said plurality of working beams; and phase retarder means for shifting the vector orientation of selected of said plurality of derivative beams in a manner whereby each of said plurality of working beams is of substantially equal intensity; said focusing means comprising lens means configured to focus each of said plurality of working beams upon the substrate in a substantially elliptical pattern, the major axis of said substantially elliptical pattern being substantially alinged with said direction of transport of the substrate.

8. An apparatus for applying optical energy to selectively remove material carried upon a substrate as recited in claim 7, wherein said apparatus further comprises beam expander means for diffusing said primary beam whereby energy concentration upon elements of the apparatus intermediate said optical generation means and the substrate is reduced.

* * * * *